(12) United States Patent
Tsubaki (10) Patent No.: US 8,342,730 B2
(45) Date of Patent: Jan. 1, 2013

(54) ILLUMINATION DEVICE, METHOD OF ASSEMBLING ILLUMINATION DEVICE, AND LIQUID CRYSTAL DISPLAY DEVICE

(75) Inventor: Yuichi Tsubaki, Matsumoto (JP)

(73) Assignee: Epson Imaging Devices Corp., Nagano (JP)

( * ) Notice: Subject to any disclaimer, the term of this patent is extended or adjusted under 35 U.S.C. 154(b) by 6 days.

(21) Appl. No.: 13/234,315

(22) Filed: Sep. 16, 2011

(65) Prior Publication Data

US 2012/0062816 A1 Mar. 15, 2012

Related U.S. Application Data

(62) Division of application No. 12/352,704, filed on Jan. 13, 2009, now Pat. No. 8,033,708.

(30) Foreign Application Priority Data

Mar. 19, 2008 (JP) .................................. 2008-070793

(51) Int. Cl.
*F21V 7/04* (2006.01)
*G09F 13/04* (2006.01)
*G09F 13/08* (2006.01)
(52) U.S. Cl. ...................... 362/612; 362/600; 362/97.1
(58) Field of Classification Search .................. 362/600, 362/601, 612, 632–634
See application file for complete search history.

(56) References Cited

U.S. PATENT DOCUMENTS

| 7,581,866 | B2 | 9/2009 | Shao et al. |
| 7,600,910 | B2 | 10/2009 | Sakai |
| 7,604,389 | B2 | 10/2009 | Sakai et al. |
| 7,775,702 | B2 * | 8/2010 | Kuroiwa ...................... 362/634 |
| 2006/0139963 | A1 | 6/2006 | Chang et al. |
| 2007/0030696 | A1 | 2/2007 | Lv et al. |
| 2007/0247870 | A1 * | 10/2007 | Sakai et al. .................. 362/612 |
| 2008/0019151 | A1 | 1/2008 | Yang et al. |
| 2009/0122520 | A1 | 5/2009 | Kuroiwa |
| 2009/0268124 | A1 | 10/2009 | Kujiraoka et al. |

FOREIGN PATENT DOCUMENTS

| JP | 2823993 | 9/1998 |
| JP | 2005077757 | 3/2005 |
| JP | 2007311327 | 11/2007 |
| JP | 2008016433 | 1/2008 |
| JP | 2009238727 | 10/2009 |

\* cited by examiner

*Primary Examiner* — Danielle Allen
(74) *Attorney, Agent, or Firm* — Lowe Hauptman Ham & Berner LLP

(57) ABSTRACT

There is provided an illumination device equipped with a light guide plate having a light emission face and a light incident face, a printed substrate having a first plane and a second plane opposite to the first plane, a plurality of point like light sources for supplying light to the light guide plate, a housing disposed at a opposite side of the light emission face of the light guide plate, and a light source holding member for holding the printed substrate. The light source holding member has a bend portion, and a edge of the bend portion is inserted in between the light guide plate and the housing.

9 Claims, 7 Drawing Sheets

ENLARGED PART A

ENLARGED PART B

ILLUMINATION DEVICE, METHOD OF ASSEMBLING ILLUMINATION DEVICE, AND LIQUID CRYSTAL DISPLAY DEVICE

This application is a divisional application of U.S. application Ser. No. 12/352,704, filed Jan. 13, 2009. The entire disclosure of Japanese Patent Application No. 2008-070793, filed Mar. 19, 2008 is expressly incorporated by reference herein.

BACKGROUND

1. Technical Field

The present invention relates to an illumination device using a light source unit having a point like light source and a light guide plate, a method of assembling the illumination device, and a liquid crystal display device equipped with the illumination device.

2. Related Art

A liquid crystal display device is not a self-light emitting element that emits light by itself but a passive element that displays an image by some sort of light from outside. Accordingly, an illumination device such as a front light, a back light, or the like is used in the liquid crystal display device.

There are two main types of the illumination device of the liquid crystal display device, a direct type capable of providing high luminance, high efficiency, and upsizing, and an edge light (side light) type for compact size, thin model, and low power consumption.

In the direct type, lamps are aligned on a back surface of a liquid crystal panel and direct light is used to form a surface light source that provides high luminance and high efficiency. However, there is a disadvantage that, for example, power consumption is large.

On the other hand, in the edge light type, not less than one light source is disposed on a side surface of a light guide plate (light guide) to form a surface like light source by defusing/scattering light in the light guide plate. Herewith, thinning and reduction of power consumption are provided.

The life of the liquid crystal display device approximately depends on the life of the light source, so that there is an advantage that the liquid crystal display device can be semi permanently used if a maintenance for exchanging a damaged light source for a new one is performed.

As such an edge light type liquid crystal display device, it is known that a light source is integrated with a light source holding body and the light source holding body is made to be detachable from a housing of the illumination device by a sliding mechanism, and an exchange operation of the light source is performed by separating the light source with the light source holding body from the housing (for example, see Japanese Patent No. 2823993).

Incidentally, a simplified exchange structure is established as for a CFL (cathode fluorescent lamp) that is a general light source. However, as for an LED unit using an LED (light emitting diode) as a light source, there is a fear of occurrence of cracking of the solder fixing an LED chip with a printed substrate or unsticking of the LED chip from the printed substrate due to contact of the LED chip and the light guide plate when slide exchange is performed as the CFL.

SUMMARY

An advantage of some aspects of the invention is to provide an illumination device capable of exchanging a light source unit (especially, light source) without applying an impact to the light source unit, a method of assembling the illumination device, and a liquid crystal display device equipped with the illumination device.

According to an aspect of the invention, there is provided an illumination device equipped with a light guide plate, a light source unit having a plurality of point like light sources for supplying light to the light guide plate and a light source holding member for holding the point like light sources, the light source unit being disposed to oppose an edge face of the light guide plate, and a housing for holding the light guide plate and the light source unit. The light source unit is constituted so as to be inserted in and extracted from the housing by a slide mechanism that can be slid along the edge face of the light guide plate, and the light source unit is equipped with a spacer for assuring a gap between the edge face of the light guide plate and the light sources at a slide insertion side end of the light source unit with respect to the housing when the light source unit is slidingly inserted in the housing.

Herewith, when the light source unit is slidingly inserted in the housing, interference of the light source and the light guide plate can be prevented. Specifically, when an LED is used as the light source, occurrence of cracking of the solder fixing an LED chip with a printed substrate, or unsticking of the LED from the printed substrate can be prevented. In this manner, an exchange operation of the light source unit can be performed while preventing occurrence of a trouble such as a failing of lighting up the light source.

It is preferable that the point like light source is constituted by an LED in the illumination device according to the aspect of the invention.

In this manner, an LED (light emitting diode) is used as the light source, so that the light source unit can be downsized as compared with the case where a CFL (cathode fluorescent lamp) that is a general light source is used.

Further, it is preferable that the spacer is provided on a surface of the light source holding member on which the point like light sources are held, and the height of the spacer from the light source holding member at the light guide plate side is set higher than the height of the point like light source from the light source holding member, and the spacer is constituted by a member that can be elastically deformed in the illumination device according to the aspect of the invention.

Herewith, the distance between the light source and the edge face of the light guide plate can be steadily assured. Further, the spacer is constituted by a member that can be elastically deformed, so that when the light source unit is slidingly inserted in the housing, an impact against the light guide plate is small even when the spacer is made contact with the light guide plate. Further, after the light source unit is slidingly inserted in the housing, the position of the light source unit with respect to the light guide plate can be adjusted by deflecting the spacer.

Further, it is preferable that the light source holding member has an opposing surface opposing the edge face of the light guide plate, and the spacer is attached on the opposing surface, and the spacer is constituted so that the outer shape is deformed when a pressing force is generated between the light source holding member at the opposing surface side and the light guide plate at the edge face side in the illumination device according to the aspect of the invention.

Herewith, since the spacer can be deflected after the light source unit is slidingly inserted in the housing, the position of the light source with respect to the light guide plate can be easily adjusted.

Further, it is preferable that the spacer has a plate spring part integrally formed at the slide insertion side end of the light source holding member, and a slope part making an acute angle between with the light source holding member is provided in the plate sprint part, and when a pressing force is generated between the light source holding member and the edge face of the light guide plate, the acute angle made by the slope part of the plate sprint part and the light source holding member is deformed to a smaller angle in the illumination device according to the aspect of the invention.

Herewith, the spacer can be formed by a relatively simple processing such as bending an end of the light source supporting member.

Further, it is preferable that the spacer is an elastic member provided on a surface of the light source holding member opposing the edge face of the light guide plate, and the outer shape of the spacer is deformed so that the thickness is reduced when a pressing force is generated between the light source holding member and the edge face of the light guide plate in the illumination device according to the aspect of the invention.

Herewith, the light source can be made close to the light guide plate side by adjusting the position of the light source with respect to the light guide plate.

Further, it is preferable that the spacer is equipped with a part that comes into face contact with the light guide plate at the edge face side in the illumination device according to the aspect of the invention.

Herewith, the distance between the light source and the light guide plate can be stabilized and occurrence of luminance unevenness can be restrained.

Further, it is preferable that the light source holding member has an L shaped cross section formed by a light source supporting part and a slide engage part that is bent in the direction perpendicular to the light source supporting part, and the light source supporting part holds the point like light sources, and the slide engage part is disposed between the light guide plate and the housing in the illumination device according to the aspect of the invention.

Further, it is preferable that a structure for pressing the light source unit to the light guide plate side is provided at the housing side of the light source unit in the illumination device according to the aspect of the invention.

Herewith, the clearance between the light source and the light guide plate can be optimally kept by adjusting the position of the light source with respect to the light guide plate. As a result, lowering of luminance due to the clearance between the light source and the light guide plate that is too large can be restrained and stable light can be obtained.

Further, it is preferable that the structure is a pressing member constituted so as to be inserted in and extracted from the housing, and when inserted in the housing, the pressing member presses the light source unit to the light guide plate side in the illumination device according to the aspect of the invention.

Herewith, the position of the light source with respect to the light guide plate can be adjusted after the light source unit is slidingly inserted in the housing.

Further, it is preferable that the pressing member includes a plate part that comes into face contact with the housing, a spring part extended from the plate part, and a contact face that is extended from the spring part and comes into face contact with the light source unit in the illumination device according to the aspect of the invention.

Herewith, the light source unit can be effectively pressed to the light guide plate side, and insertion and extraction of the pressing member with respect to the housing can be easily performed.

Further, it is preferable that the pressing member presses the light source unit to the light guide plate side so that a light emission direction of the light source becomes perpendicular or approximately perpendicular to the edge face of the light guide plate in the illumination device according to the aspect of the invention.

Herewith, occurrence of luminance unevenness due to lack of stability of the clearance between the light source and the light guide plate can be restrained, and light from the light source can be effectively supplied to the light guide plate.

Further, it is preferable that an elastic force of the spacer equipped on the light source unit is set larger than an elastic force of the structure that presses the light source unit to the light guide plate side in the illumination device according to the aspect of the invention.

Herewith, when the light source unit is pressed by the aforementioned structure, the spacer can be surely deflected and the position of the light source with respect to the light guide plate can be adequately adjusted.

Furthermore, according to another aspect of the invention, there is provided a liquid crystal display device that includes the illumination device according to any one of the aforementioned illumination devices and a liquid crystal panel to which light is emitted by the illumination device.

Herewith, assembling and exchanging operations of the light source unit can be performed without applying an impact to the light source unit (specifically, light source), and the liquid crystal display device in which in which the illumination device having good luminance uniformity is mounted can be provided.

Further, according to another aspect of the invention, there is provided a method of assembling an illumination device equipped with a light guide plate, a light source unit having a plurality of point like light sources for supplying light to the light guide plate and a light source holding member for holding the point like light sources, the light source unit being disposed to oppose an edge face of the light guide plate, and a housing for holding the light guide plate and the light source unit. The method of assembling the illumination device includes slidingly inserting the light source unit in the housing along the edge face of the light guide plate in the state where a distance between the light source and the edge face the light guide plate is assured by a spacer formed at a slide insertion side end of the light source unit with respect to the housing, and slidingly inserting a pressing member for pressing the light source unit to the light guide plate side in the housing after the light source unit is slidingly inserted in the housing.

Herewith, the illumination device can be assembled without applying an impact to the light source unit (specifically, light source), and the illumination device having good luminance uniformity can be assembled.

Further, according to another aspect of the invention, there is provided an illumination device equipped with a light guide plate, a light source unit having a plurality of point like light sources for supplying light to the light guide plate and a light source holding member for holding the point like light sources, the light source unit being disposed to oppose an edge face of the light guide plate, and a housing for holding the light guide plate and the light source unit. The light source unit is constituted so as to be inserted in and extracted from the housing by a slide mechanism that can be slid along the edge face of the light guide plate, and a structure for pressing the point like light sources held on the light source unit toward the edge face of the light guide plate by elasticity is provided at a side of the light source unit opposite to the edge face of the light guide plate.

Herewith, the clearance between the light source and the light guide plate can be optimally kept by adjusting the position of the light source with respect to the light guide plate. As a result, lowering of luminance due to the clearance between the light source and the light guide plate that is too large can be restrained and stable light can be obtained.

BRIEF DESCRIPTION OF THE DRAWINGS

The invention will be described with reference to the accompanying drawings, wherein like numbers reference like elements.

DESCRIPTION OF EXEMPLARY EMBODIMENTS

Hereinafter, an embodiment of the invention will be described based on the accompanying drawings.

Figure 1:
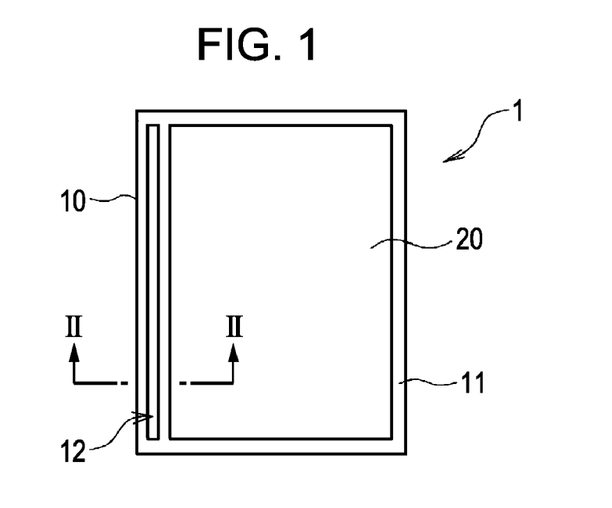
FIG. 1 is a plan view showing a liquid crystal module according to an embodiment.

FIG. 1 is a plan view showing a liquid crystal module 1 constituting a liquid crystal display device according to a first embodiment.

The liquid crystal module 1 is equipped with a back light 10 and a liquid crystal panel 20, and the liquid crystal display device is equipped with the liquid crystal module 1, a driver IC for driving the liquid crystal panel 20, and a signal control circuit (not shown) thereof.

The back light 10 is equipped with a light source unit 12 and a case 11 formed by a resin or a plate (metal) for holding optical sheets to be described below. The back light 10 is disposed behind the liquid crystal panel 20 and illuminates the liquid crystal panel 20.

Figure 2:
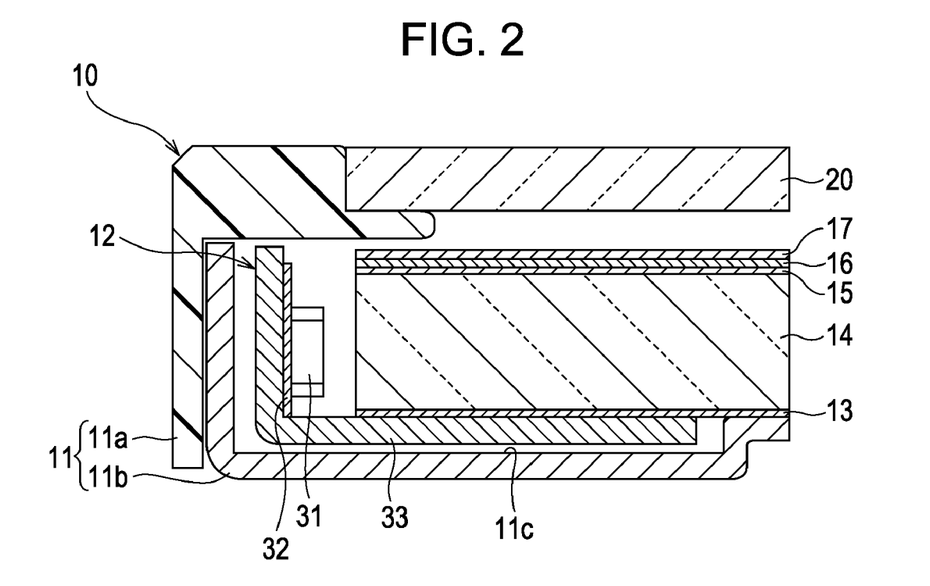
FIG. 2 is a cross sectional view showing the liquid crystal module.

FIG. 2 is cross sectional view taken along the line II-II of FIG. 1.

As shown in FIG. 2, the case 11 of the back light 10 is constituted by combining an upper case 11a and a lower case 11b. Herein, the upper case 11a is formed by a resin material, and is formed to have a frame shape having an opening part at the center. The lower case 11b is made of aluminum, and formed to have a box shape whose front face (upper side in FIG. 2) is opened.

Note that the upper case 11 may be constituted by a plate (stainless). In this case, effect of heat radiation property can be enhanced. Further the lower case 11b may be formed to have a frame shape having an opening part at the center.

The back light 10 is equipped with a light source unit 12, and optical sheets such as a reflection sheet 13, a light guide plate 14, a diffusion sheet 15, lens sheets 16, 17, and the like, and the light source unit 12 and the optical sheets are held in the case 11.

The light source unit 12 is constituted by a plurality of LED's (Light Emitting Diode) 31 as point like light sources, a printed substrate (FPC or PWB) 32 on which the plurality of LED's are fixed by soldering, and a lamp house 33 having an L shaped cross section on which the printed substrate 32 is fixed with an adhesive agent such as a double-sided tape.

The light sour unit 12 is oppositely disposed to a side surface of the light guide plate 14 along a longitudinal direction of the light guide plate 14, so that the light from the LED 31 is introduced into the side surface of the light guide plate 14. Further, the light guide unit 12 can be slid in the longitudinal direction of the light guide plate 14 along a slide mechanism 11c of the lower case 11b formed at the side surface side of the light guide plate 14. The slide mechanism 11c has an opening part at an end thereof through which the light source unit 12 can be inserted and extracted, and the light source 12 can be inserted into and extracted from the case 11 via the opening part.

The light guide plate 14 emits the light from the LED 31 from the light guide plate upper surface. As for the light guide plate 14, a transparent plastic resin such as an acrylic resin is used. The reflection sheet 13 is disposed on the lower surface of the light guide plate 14 in order to prevent the light introduced from the light guide plate introduce surface to be emitted from the surface except the light guide plate upper surface.

The diffusion sheet 15 further diffuses the light which is not equalized by the diffusion pattern of the light guide plate 14 to equalize the light, and also plays a role to make it difficult to see the direct light from the light source.

The light introduced in this manner is focused by the lens sheets 16, 17, and is introduced on the back surface of the liquid crystal panel 20.

Note that the number of the diffusion sheet and the lens sheet, and the order thereof are not limited thereto as far as sufficient brightness can be obtained for the liquid crystal panel 20.

The liquid crystal panel 20 is formed by a transparent material having insulation properties, for example, a glass substrate. Two substrates are opposed with a predetermined interval, the outer circumferences of a display area are bonded by a seal material and liquid crystal is enclosed, and a polarizer is bonded on each of the upper and lower surface to constitute the liquid crystal panel 20.

The liquid crystal panel 20 is disposed on the upper portion (upper side in FIG. 2) of the upper case 11a of the back light 10 to complete the liquid crystal module 1.

Herein, the case 11 corresponds to the housing and the lamp house 33 corresponds to the light source holding member.

Figure 3:
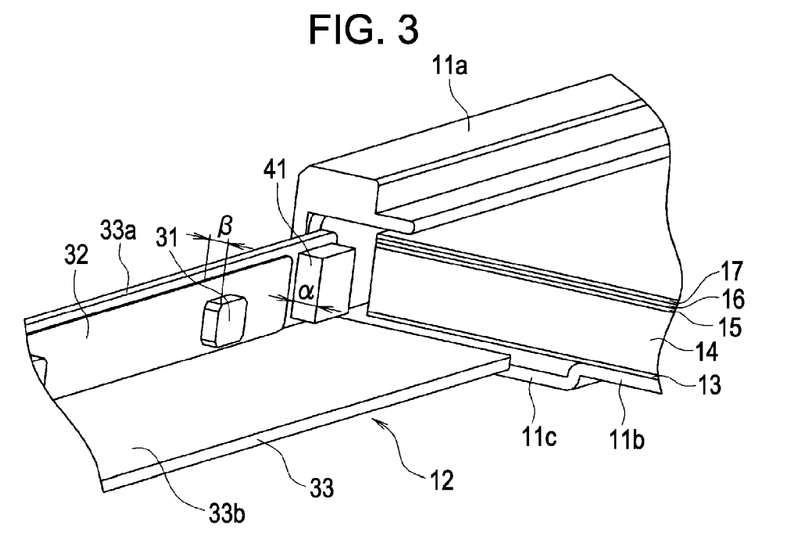
FIG. 3 is a perspective view showing a detailed structure of a light source unit.

FIG. 3 is a perspective view showing a detail structure of the light source unit 12.

The light source unit 12 is constituted by the LED's 31, the printed substrate 32, the lamp house 33 as described above. The lamp house 33 is a member having an L shaped cross-section. The printed substrate 32 on which the plurality of LED's 31 are mounted with a predetermined interval are fixed to a light source supporting part 33a opposing a side surface of the light guide plate 14 among plate parts of the lamp house 33 perpendicular to each other so that the light from the LED's 31 is emitted toward the side surface of the light guide plate 14. Further, a slide engagement part 33b perpendicular to the light source supporting part 33a is engaged with the slide mechanism 11c and disposed at a part of the back surface of the light guide plate 14.

The lamp house 33 is formed by a material having good heat conductivity, for example, aluminum, and plays a role to radiate the heat of the LED's 31.

The light source unit 12 can be inserted in and extracted from the case 11 along the slide mechanism 11c of the lower case 11b. A spacer 41 is fixed with an adhesive agent such as a double sided tape to the light source supporting part 33a of the lamp house 33 at a slide insertion side end of the light source unit 12 with respect to the case 11.

The spacer 41 is an elastic member (elastic resin) having an approximately rectangular solid shape. The height of the spacer 41 from the light source supporting part 33a at the light guide plate 14 side is set higher than the height of the LED 31 from the light source supporting part 33a. That is, the thickness $\alpha$ of the spacer 41 is formed thicker than the added thickness $\beta$ of the LED 31 and the printed substrate 32 by a predetermined clearance.

Figure 4:
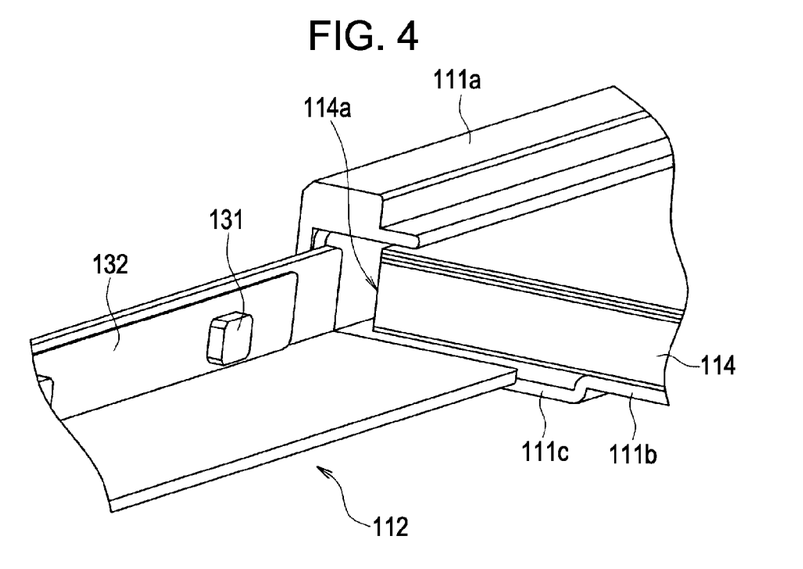
FIG. 4 is a perspective view showing a detailed structure of a general light source unit.

FIG. 4 is a perspective view showing a general structure of the light source unit 112 in which the spacer 41 in not provided.

When the light source 112 is slidingly inserted in the case 111 along the slide mechanism 111c of the lower case 111b, an edge 114a of the light guide plate 114 and the LED 131 may be interfered. Accordingly, there is a fear that the LED 31 fails lighting due to occurrence of cracking of the solder fixing the LED 131 with the printed substrate 132, or unsticking of the LED 131 from the printed substrate 132.

On the contrary, in the embodiment, since the spacer 41 is provided at the slide insertion side end of the light source unit 12, a predetermined clearance ($=\alpha-\beta$) can be assured between the LED 31 and the light guide plate 14, and contact of the edge of the light guide plate 14 and the LED's 31 can be prevented when the light source unit 12 is inserted in the case 11.

Incidentally, it is known that the clearance between the LED 31 and the light guide plate 14 provides a large influence to luminance and luminance unevenness of the back light surface. When the clearance is too large or instable, there occurs lowering of luminance and luminance unevenness.

Consequently, in the embodiment, after the light source unit 12 is slidingly inserted in the case 11, a pressing member for pressing the light source unit 12 to the light guide plate 14 side is to be inserted between the lamp house 33 and the lower case 11b to keep the aforementioned clearance at the optimum value.

Figure 5:
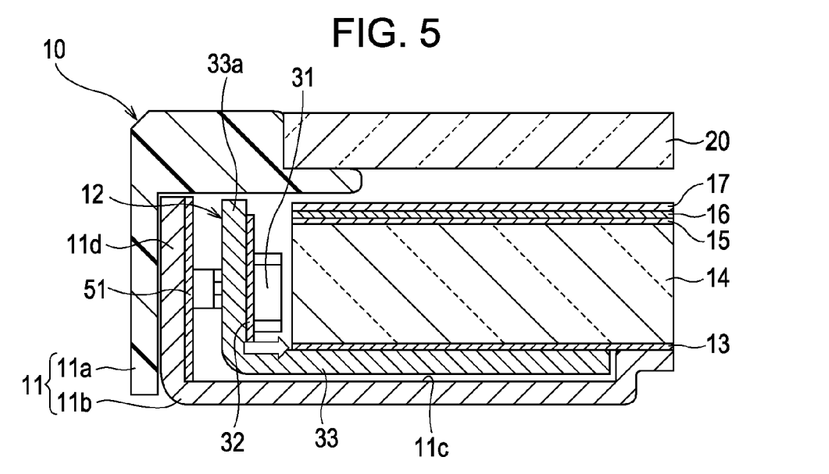
FIG. 5 is a cross sectional view showing the liquid crystal module in the state where a pressing member is inserted.

FIG. 5 is a cross sectional view showing a state where the pressing member is inserted between the lamp house 33 and the lower case 11b.

As shown in FIG. 5, a pressing member 51 for pressing the light source unit 12 to the light guide plate 14 side is inserted between the light source supporting part 33a of the lamp house 33 and a plate part 11d of the lower case 11b opposing the light source supporting part 33a.

Figure 6:
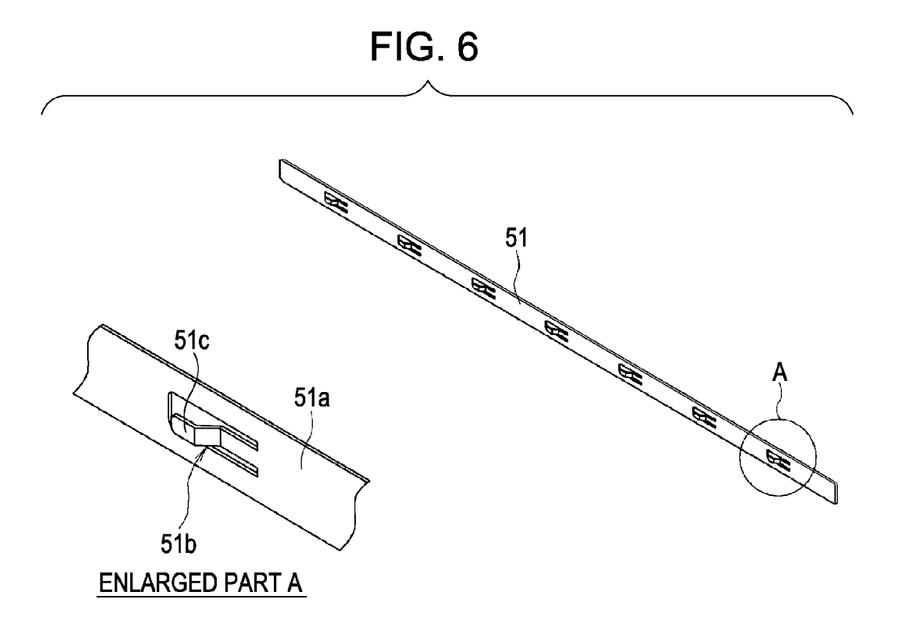
FIG. 6 is a perspective view showing a detailed structure of the pressing member.

FIG. 6 is a perspective view showing a detailed structure of the pressing member 51.

The pressing member 51 is formed by a member having good heat conductivity, for example, aluminum similarly to the lamp house 33, and as shown in FIG. 6, a plurality of parts of a plate part 51a having a flat plate shape are bent to project from one surface side. The projections form a plurality of spring parts 51b function as a spacer having a spring effect.

Herein, the spring parts 51b are formed with a predetermined interval at the center of the plate part 51a in the width direction. The predetermined interval shall be, for example, 1/n (n is positive integer) of the mounting interval of the LED's 31.

Further, the spring part 51b includes a contact face 51c that is parallel (or approximately parallel) to the plate part 51a. Then, when the pressing member 51 is inserted between the light source supporting part 33a and the plate part 11d, the contact face 51c is to be made contact with the light source supporting part 33a or the plate part 11d.

Figure 7:
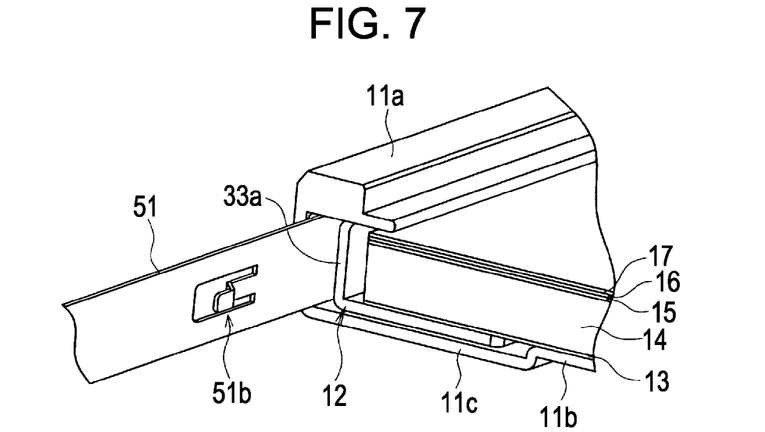
FIG. 7 is a perspective view showing an insertion example of the pressing member.

FIG. 7 is a diagram showing an insertion example of the pressing member 51.

As shown in FIG. 7, the contact face 51c is made contact with a back surface of the light source supporting part 33a (surface opposite to the mounting surface of the LED 31) and the sprint parts 51b press the back surface of the light source supporting part 33a when the pressing member 51 is inserted between the light source supporting part 33a and the plate part 11d of the lower case 11d in the state where the spring part 51b is oriented toward the light source supporting part 33a side of the lamp house 33.

At this time, the spring part 51b is to press near the mounting portion of the LED 31 among the back surface of the light source supporting part 33a. In this manner, by pressing near the mounting portion of the LED 31 with the pressing member 51 made of a material having good heat conductivity, radiation effect for the LED 31 can be obtained. Further, the contact face 51c is constituted by a flat surface, so that the radiation effect for the LED's 31 when made contact with the back surface of the light source supporting part 33a can be improved.

Further, the shape and pressing force of the spring part 51b shall be designed so that the clearance between the LED 31 and the light guide plate 14 becomes the optimum value (for example, 0.1 to 0.3 mm) when the pressing member 51 is inserted between the light source supporting part 33a and the plate part 11d. Herein, the elastic force of the spacer 41 shall be set larger than the elastic force of the spring part 51b.

In this manner, in the state where the back light 10 is assembled, by assuring the optimum clearance between the LED 31 and the light guide plate 14, it can be restrained that the guide light plate 14 is easily influenced by the heat of the LED's 31 due to arrangement of the LED's 31 and the light guide plate 14 without a space.

Next, an assembling method of the liquid crystal module 1 will be described.

First, the reflection sheet 13, the light guide plate 14, the diffusion sheet 15, the lens sheets 16 and 17 are sequentially inserted in the lower case 11b from the upper direction (upper direction in FIG. 2) of the lower case 11b in this order. Herewith, the optical sheets are laminated on the bottom of the lower case 11b in a contact manner.

Next, the upper case 11a is covered from the upper direction of the lower case 11b, and upper case 11a and the lower case 11b are fixed with a fastener member not shown such as a screw.

Then, the light source unit 112 is slidingly inserted along the slide mechanism 11c of the lower case 11b via the opening part provided between the upper case 11a and the lower case 11b. At this time, the slide engage part 33b of the lamp house 33 is engaged with the slide mechanism 11c.

The spacer 41 is provided at the slide insertion side end of the light source supporting part 33a. Accordingly, the light source unit 12 can be slidingly inserted in the case 11 in the state where the gap between the LED 31 and the light guide plate 14 are assured. Accordingly, it can be prevented that the LED 31 and the edge of the light guide plate 14 are interfered when the light source unit 12 is slidingly inserted.

In this manner, by slidingly inserting the light source unit 12 in the case 11, the light source unit 12 is oppositely disposed to an edge face of the light guide plate 14 in the longitudinal direction.

Then, as shown in FIG. 5, the pressing member 51 is inserted between the light source supporting part 33a of the lamp house 33 and the plate part 11d of the lower case 11b and the light guide unit 12 is pressed to the light guide plate 14 side. At this time, the spacer 41 is deflected by the pressing force of the pressing member 51, and the outer shape is deformed to reduce the thickness of the spacer 41. Herewith, the clearance between the LED 31 and the light guide plate 14 is optimally kept. As described above, the spacer 41 is formed in an approximately rectangular solid shape, and the spacer 41 and the edge face of the light guide plate 14 are constituted to surface contact with each other. Accordingly, the clearance between the LED 31 and the light guide plate 14 is stably kept. In this manner, the back light is completed.

Next, a double sided tape is adhered on a bonding plane of the upper case 11a with the liquid crystal panel 20, and a back surface of the liquid crystal panel 20 is adhered thereon. Herewith, the back light 10 and the liquid crystal panel 20 are fixed in the state where the back light 10 is disposed behind the liquid crystal panel 20, and the liquid crystal module 1 is completed.

On the other hand, when the light source unit 12 is exchanged, first, the pressing member 51 is slidingly extracted from the case 11. Herewith, the pressing force from the pressing member 51 to the light source unit 12 is released, and a sufficient clearance is assured between the light source unit 12 and the light guide plate 14.

Then, in the state, the light source unit 12 is slid along the slide mechanism 11c, and is extracted from the case 11 via the opening part provided between the upper case 11a and the lower case 11b.

In this manner, in the aforementioned embodiment, the light source unit is constituted so as to be inserted into and extracted from the case in which the optical sheets such as the light guide plate are held, and the spacer for assuring the clearance between the LED and the light guide plate when slidingly inserted is provided at the slide insertion side end of the light source unit. Accordingly, interference of the LED and the edge of the light guide plate when the light source unit is slidingly inserted can be prevented.

As a result, occurrence of cracking of the solder fixing the LED with the printed substrate, or unsticking of the LED from the printed substrate can be prevented, and failing of lighting up the LED 31 can be prevented.

Further, the LED is used as a light source, so that the light source unit can be downsized as compared with the case where a CFL (cathode fluorescent lamp) is used as a general light source.

Further, since the height of the aforementioned spacer from the light source holding member at the light guide plate side is set higher than the height of the light source from the light source holding member, the clearance between the light source and the edge face of the light guide plate can be steadily assured.

Further, the aforementioned spacer has an approximately rectangular solid shape, and equipped with a part that comes into surface contact with the light guide plate at the edge face side. Accordingly, the clearance between the light source and the light guide plate can be stably assured, and occurrence of luminance unevenness can be restrained.

Furthermore, the member that can be elastically deformed is used as the aforementioned spacer. Accordingly, when the light source unit is slidingly inserted, even when the spacer is made contact with the light guide plate, impact to the light guide plate is small. Further, after the light source unit is slidingly inserted, the position of the LED with respect to the light guide plate can be adjusted by deflecting the spacer. Further, the spacer is constituted by a member different from the light source supporting part, the spacer having any complicated shape can be formed.

Further, after the light source unit is slidingly inserted, since the pressing member for pressing the light source unit to the light guide plate side is inserted, the clearance between the LED and the light guide plate can be optimally kept. As a result, lowering of luminance due to the clearance between the light source unit and the light guide plat that is too large, and occurrence of luminance unevenness due to lack of stability of the clearance can be restrained, and stable light can be obtained.

Furthermore, since the pressing member having a spring effect is used, the light source unit can be effectively pressed to the light guide plate side, and insertion and extraction of the pressing member itself can be also easily performed.

In this manner, assembly and exchange operations of the light source unit can be performed without applying an impact to the light source unit, and the liquid crystal display device in which an illumination device having good luminance uniformity is mounted can be provided.

Figure 8:
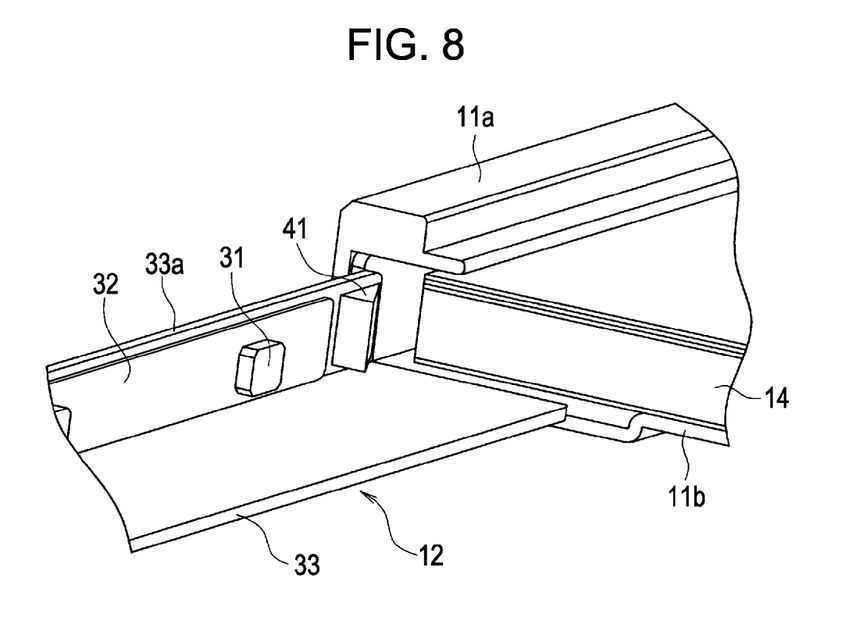
FIG. 8 is a perspective view showing a modification of the spacer.

Note that, in the aforementioned embodiment, as shown in FIG. 8, the outer shape (sectional area) of the spacer 41 may be reduced from the fixed side with the light source supporting part 33a toward the light guide plate 14 side. Herewith, when the lamp house 33 is pressed to the light guide plate 14 side with the pressing member 51, the spacer 41 becomes easy to be deflected, and it becomes easy to adjust the clearance between the LED 31 and the light guide plate 14.

In this case, when slopes are formed in the directions in which the light source unit 12 is slidingly inserted and extracted as shown in FIG. 8, the insertion operation and extraction operation of the light source unit 12 with respect to the case 11 can be easily performed.

Further, in the aforementioned embodiment, an elastic member different from the light source supporting part 33a is described as the spacer 41 for assuring the clearance between the LED 31 and the light guide plate 14 when slidingly inserting the light source unit 12. However, as shown in FIG. 9, the aforementioned spacer 41 may be formed by bending the slide insertion side end of the light source supporting part 33a of the lamp house 33.

Figure 9:
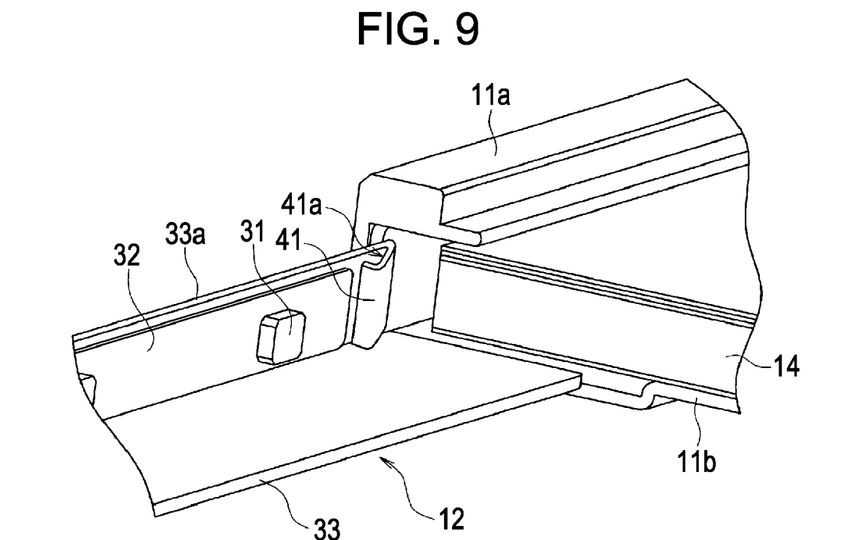
FIG. 9 is a perspective view showing a modification of the spacer.

The spacer 41 shown in FIG. 9 has a structure having a plate spring part integrally formed at the slide insertion side end of the light source supporting part 33a. A slope part 41a forming an acute angle between with the light source supporting part 33a is formed in the plate spring part. When a pressing force is generated between the light source supporting part 33a and the edge face of the light guide plate 14, the acute angel formed by the inclination part 41a and the light source supporting part 33a is to be deformed to a smaller angle.

In this manner, the spacer 41 can be formed by a relatively easy fabricating process, and the spacer 41 is integrally formed with the light source supporting part 33a. Accordingly, effort for adhering the spacer 41 formed by a separate member to the light source supporting part 33a can be saved. Further, a trouble such as unsticking of the spacer 41 from the light source supporting part 33a due to interference of the spacer 41 and the edge of the light guide plate 14 is prevented when the light source unit 12 is slidingly inserted.

Note that the shape of the spacer 41 is not limited to the aforementioned shape, and any shape may be used as far as the clearance between the LED 31 and the light guide plate 14 is assured when the light source unit 12 is slidingly inserted in the case 11, and the clearance between the LED 31 and the light guide plate 14 is optimally kept when the light source unit 12 is inserted in the case 11 and the light source unit 12 is pressed to the light guide plate 14 side with the pressing member 51.

Figure 10:
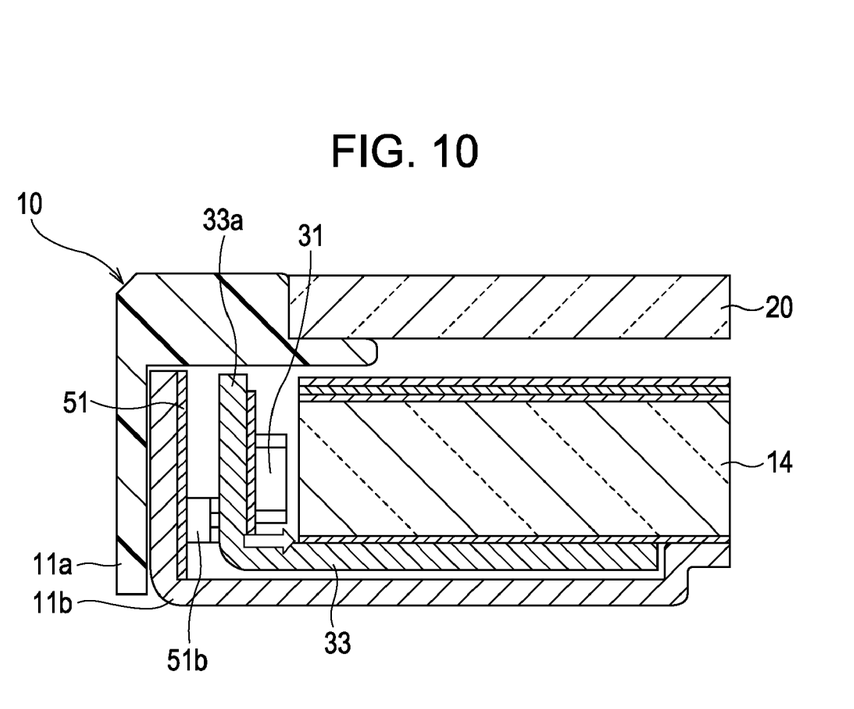
FIG. 10 is a diagram showing a modification of a spring member.

Further, in the aforementioned embodiment, the case is described in which the spring part 51b of the pressing member 51 is provided at the center of the pressing member 51 in the width direction, and the spring part 51b presses the light source supporting part 33a near the mounting portion of the LED 31. However, as shown in FIG. 10, the spring part 51b may press near the bending part of the lamp house 33 (lower side of the light source supporting part 33a in FIG. 10).

The lamp house 33 has an L shaped cross section, and the rigidity with respect to a pressing force from the back surface side of the light source supporting part 33a is highest at the vicinity of the bending part. Accordingly, by pressing the vicinity of the bending part with the sprint part 51b, the lamp house 33 can be slid to the light guide plate 14 side while restraining deflection of the lamp house 33.

Figure 11A:
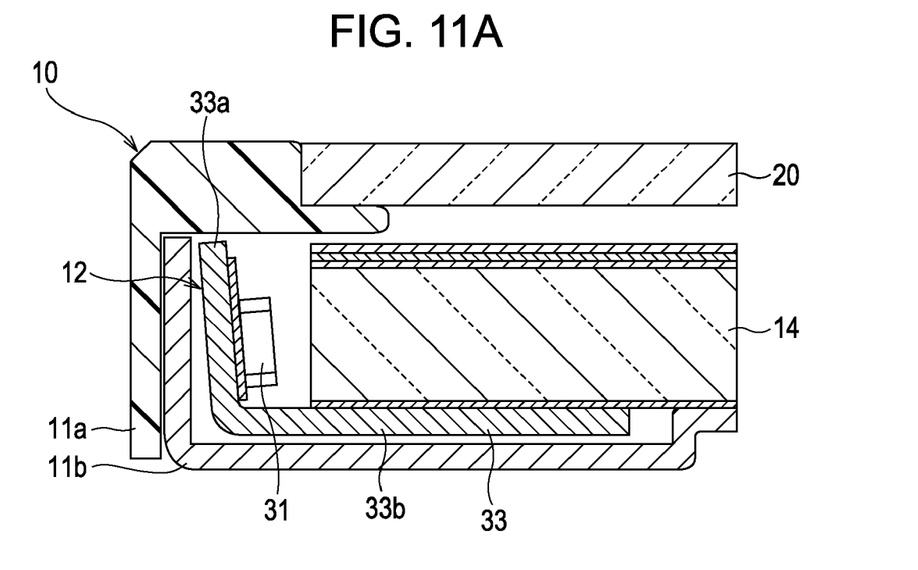
FIGS. 11A and 11B are diagrams showing a modification of the spring member.
Figure 11B:
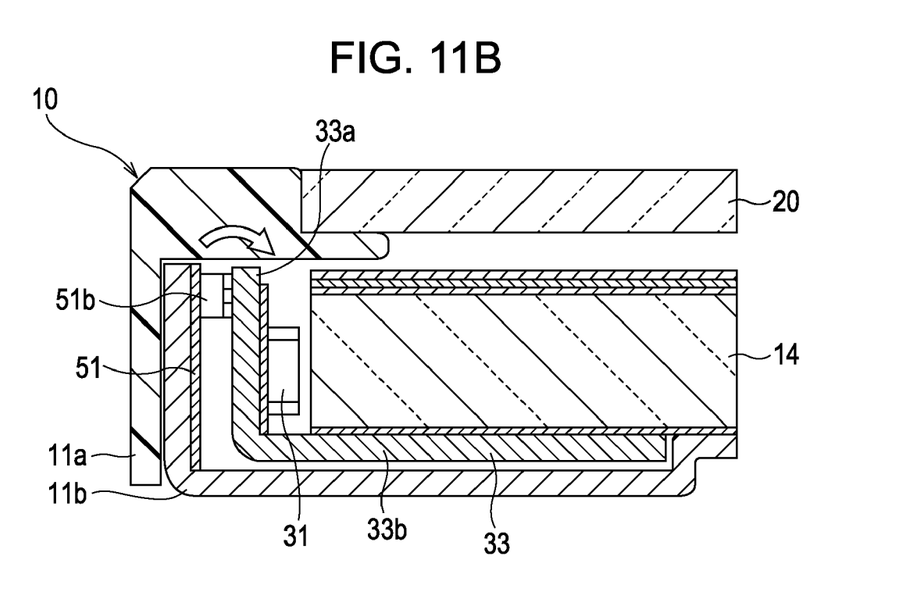

Further, in the aforementioned embodiment, the side opposite to the bending part of the light source supporting part 33a may be pressed with the sprint part 51b of the pressing member 51. In this case, as shown in FIG. 11A, the lamp house 33 is formed so that the angle made by the light source supporting part 33a and the slide engage part 33b becomes a blunt angle. Herewith, when the upper side of the light source supporting part 33a than the mounting portion of the LED 31 (upper side of the light source supporting part 33a in FIG. 11A) is pressed with the sprint part 51b, the angel made by the light source supporting part 33a and the slide engage part 33b becomes a right angle or an approximately right angle by the deflection of the lamp house 33 as shown in FIG. 11B.

Figure 12:
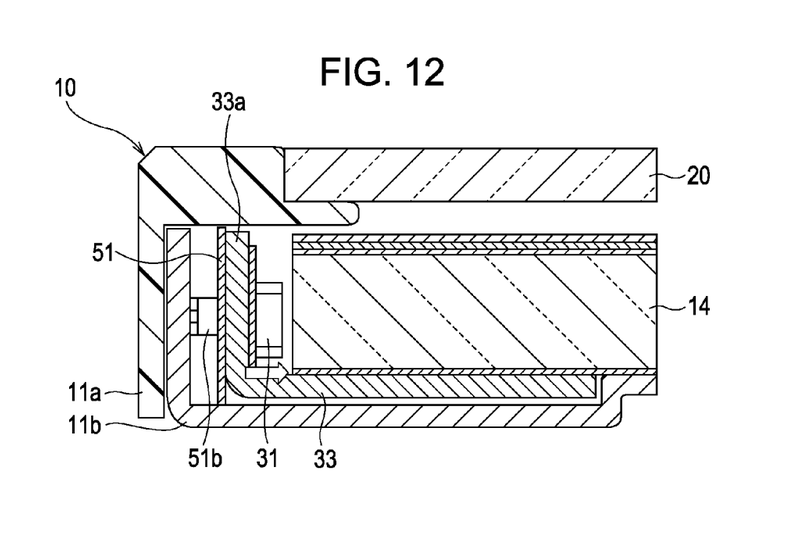
FIG. 12 is a diagram showing a modification of insertion of the spring member.

Further, in the aforementioned embodiment, the pressing member 51 is disposed in the direction so that the sprint part 51b is made contact with the light source supporting part 33a of the lamp house 33. However, the pressing member 51 may be disposed so that the spring part 51b is made contact with the plate part 11b of the lower case 11b as shown in FIG. 12. Herewith, the entire back surface of the light source supporting part 33a can be evenly pressed, so that the lamp house 33 can be slid to the light guide plate 14 side without inclining the lamp house 33.

In this manner, the lamp house 33 is pressed to the light guide plate 14 side so that the light emission surface of the LED 31 and the side surface of the light guide plate 14 become parallel (or approximately parallel). Accordingly, the light emission direction of the LED 31 and light incident plane of the light guide plate 14 can be set so as to be perpendicular or approximately perpendicular, and light from the LED 31 to the light guide plate 14 can be efficiently supplied.

Figure 13:
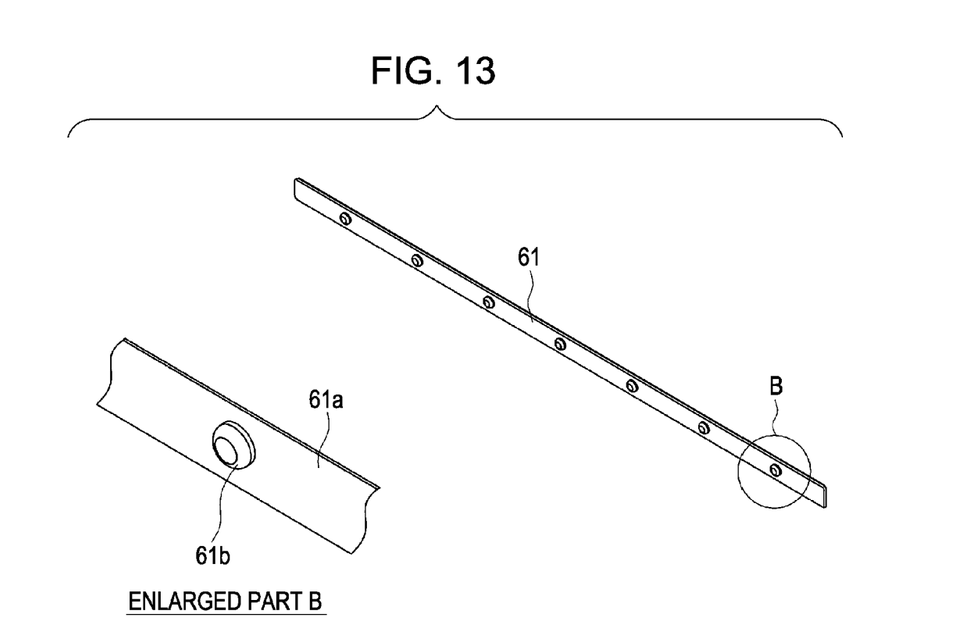
FIG. 13 is a diagram showing a modification of the spring member.

Furthermore, in stead of the pressing member 51, a pressing member 61 shown in FIG. 13 can be applied to the aforementioned embodiment. A plurality of lubbers (cushion material) 61b that function as a spacer having a spring effect are selectively adhered on one surface of a flat plate 61a in the pressing member 61. After the light source unit 12 is slidingly inserted, by inserting the pressing member 61 between the light source supporting part 33a of the lamp house 33 and the plate part 11d of the lower case 11b, the similar effect obtained when the pressing member 51 is inserted can be obtained.

Further, if a taper is formed in the rubber 61b, operations for inserting the pressing member 61 between the light source supporting part 33a and the plate part 11d, and for extracting the pressing member 61a from between the light source supporting part 33a and the plate pat 11d can be easily performed.

The case where the pressing members 51, 61 have a part that functions as a spacer having a sprint effect is described. However, any pressing member may be employed as far as the spacer functions as a spacer capable of pressing the light source unit 12 to the light guide plate 14 side.

For example, the pressing members 51, 61 may be an elastic member whose outer shape is deformed when receiving a pressing force as the spacer 41 shown in FIGS. 3 and 8 that is attached on one surface of a flat plate, or may be a part of a flat plate that is bent to form a slope part, the slope part being deformed when a pressing force is received as the spacer 41 shown in FIG. 9.

Further, in the embodiment, the case is described in which the slide mechanism for inserting and extracting the light source unit 12 in and from the case 11 is provided in the lower case 11b. However, the slide mechanism may be provided in the upper case 11a.

Furthermore, in the aforementioned embodiment, the case where the LED is applied as a point like light source. However, the invention may be applied to an electric lamp or the like.

Further, in the aforementioned embodiment, the case is described in which the illumination device according to the invention is applied to a back light of a liquid crystal display device. However, the illumination device may be applied to a side light or a front light.

What is claimed is:

1. An illumination device, comprising:
a light guide plate having a light emission face and a light incident face;
a printed substrate having a first plane and a second plane opposite to the first plane;
a plurality of point light sources for supplying light to the light guide plate, the plurality of point light sources each having a mounting surface and a luminescence surface facing the light incident face of the light guide plate, the plurality of the point light sources being mounted at a predetermined interval on the first plane of the printed substrate with the mounting surfaces contacting the first plane;
a housing disposed at an opposite side of the light emission face of the light guide plate; and
a light source holding member having a light source supporting part contacting the second plane of the printed substrate for holding the printed substrate, the light source holding member having a bend portion bent from the light source supporting part in cross-section view,
wherein an edge of the bend portion inserted in between the light guide plate and the housing serves as a spacer for assuring a clearance between the light sources and the light guide plate.

2. The illumination device according to claim 1, wherein each of the point light sources is a light emitting diode (LED).

3. The illumination device according to claim 1, wherein, the luminescence surface is opposite to the mounting surface.

4. The illumination device according to claim 1, wherein the light source holding member has an L shaped cross-section.

5. The illumination device according to claim 1, wherein the bend portion is bent in a direction perpendicular to the light source supporting part.

6. The illumination device according to claim 1, wherein the housing has a difference in level for inserting the edge of the bend portion in between the light guide plate and the housing.

7. The illumination device according to claim 1, wherein a side edge of the printed substrate is in contact with a plane of the bend portion on a side of the housing.

8. The illumination device according to claim 1, wherein centers of the plurality of point light sources are lower than a center of the printed substrate in a width direction of the printed substrate.

9. A liquid crystal display device comprising the illumination device according to claim 1 and a liquid crystal panel for receiving light emitted by the illumination device.

* * * * *